Patented Oct. 8, 1940

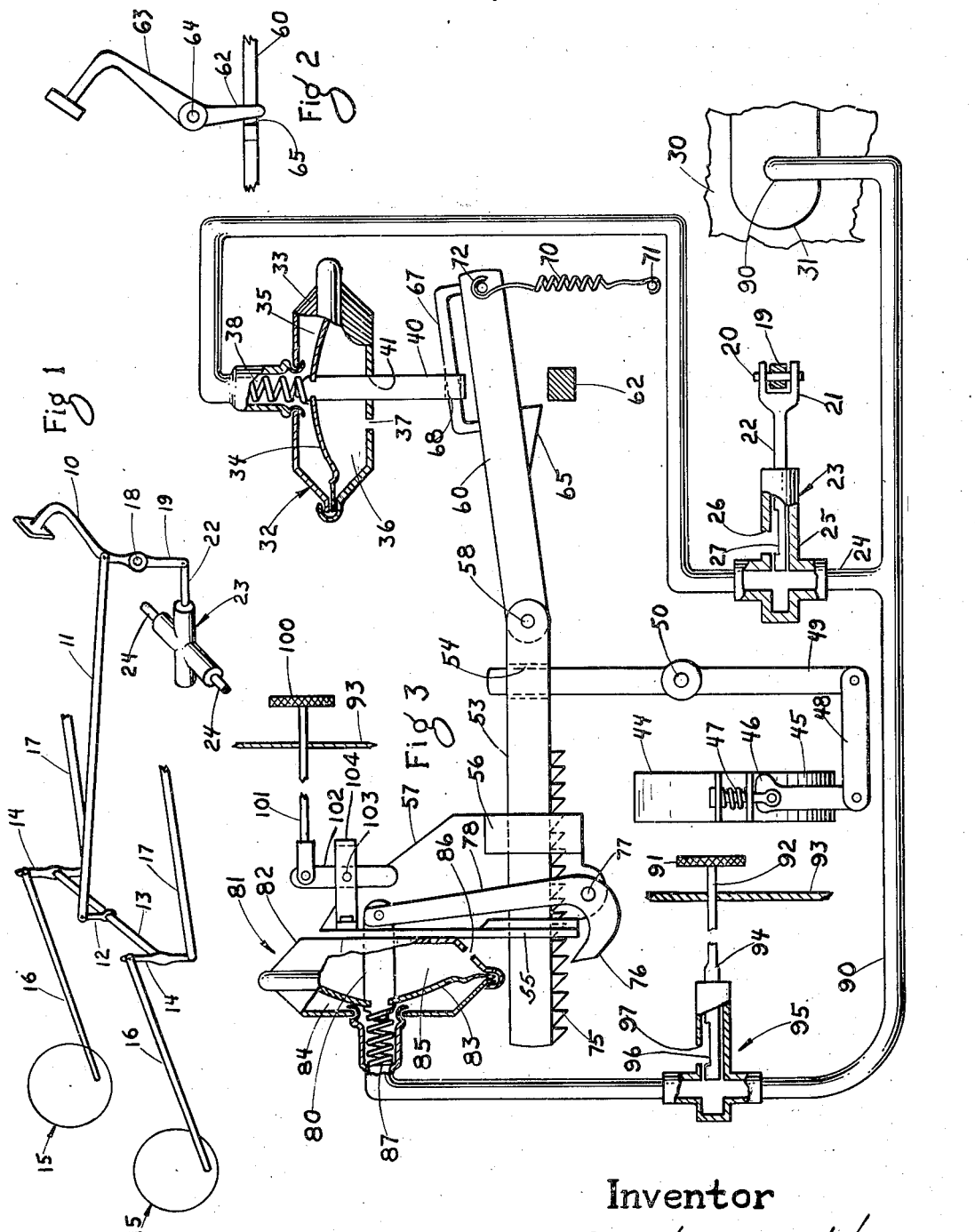

2,217,230

UNITED STATES PATENT OFFICE

2,217,230

BRAKE SYSTEM FOR AUTOMOBILES

Everett C. Morphet, Wilmar, Calif.

Application March 22, 1939, Serial No. 263,376

11 Claims. (Cl. 192—13)

My invention relates to braking mechanisms for vehicles with special reference to automobiles, and is directed specifically to a brake system that is associated in a novel manner with the usual clutch control.

In conventional automotive brake systems, a primary or service brake mechanism is operated by a right foot pedal, the clutch being operated by a left foot pedal, and an auxiliary or emergency brake mechanism is operated by a right hand lever. That such an arrangement has several disadvantages is well known. One disadvantage is that the arrangement is awkward when it is necessary to start the engine of a car on a hill, because if the right foot is on the brake pedal to hold the car it is not free to depress the starter. It becomes necessary in such a situation to apply the emergency brake to free the right foot for the starter. Again, when the car is brought to a stop on a hill with the engine running, the conventional arrangement is inconvenient for the driver because the right foot is not free to depress the accelerator, and he must either resort to a hand-operated accelerator control or employ the emergency brake to permit release of the service brake pedal. A further disadvantage is that the operator has the burden of remembering to release the emergency brake when starting up the car after a parking period. Failure to remember is a common occurrence and causes unnecessary brake wear as well as waste of power. Finally the emergency brake lever in itself is objectionable as an obstacle interfering with freedom of movement in the floor space forward of the front seat, especially in cars designed to accommodate three persons in front.

A general object of my invention is to achieve a braking system and arrangement for an automobile that will be free of the above disadvantages. As one object I propose to provide a braking mechanism operated by the clutch pedal in addition to the usual function of that pedal, so that the driver's right foot will be free to operate either the starter or the accelerator pedal without the necessity of hand-movements. In fact I propose to eliminate the emergency brake lever and the necessity for any hand movements whatsoever in governing the brakes of the car.

Another object of my invention is to provide, in addition to the usual service brakes operated by a brake pedal, auxiliary brakes operable by the usual clutch pedal, whereby the auxiliary brakes may either supplement the primary service brakes in an emergency, or take the burden of the service brakes when it is desirable to release the brake pedal. One advantage of this arrangement is that if one pedal-operated braking mechanism fails a second pedal-operated braking mechanism is immediately available. A feature of the preferred form of my invention is that operation of the second brake entails no additional movement whatsoever on the part of the driver over the movements required for conventional driving. An emergency brake of the conventional type is neglected in an emergency more often than not because, in the first place it requires a hand movement, whereas only foot movements are associated with normal driving and, in the second place, because it requires movement on the part of the driver additional to his habitual manipulations for stopping the car.

If a clutch pedal is given the additional function of applying an auxiliary brake mechanism it is desirable to arrange for braking action and clutching action to be controlled by closely adjacent positions of the pedal whereby on one hand the engine will take hold as soon as the braking mechanism is released on a hill and on the other hand the brake mechanism will become effective instantly when the clutch is disengaged for a stop. But a simple mechanical connection between the clutch pedal and the auxiliary brake mechanism that would be desirable for these considerations would be highly objectionable in practice because the auxiliary brake mechanism would be applied every time the driver changes gears to pick up speed. It is apparent that conflicting considerations are involved and one of the features of my invention is the conception that such conflict can be resolved by providing a selective relationship between the clutch pedal and brake mechanism. In other words, I propose to have the brake mechanism and the clutch affected by as closely adjacent positions of the clutch pedal as desired, but to have the clutch-releasing movement of the clutch pedal operate the brake mechanism only at the will of the driver.

In such an arrangement the means for operatively connecting the clutch pedal and auxiliary brake mechanism must be movable between an effective and an ineffective disposition and some control means is necessary to shift the connecting means from one of its dispositions to the other. Ordinarily such a control would involve an additional burden on the driver, but a further object of my invention is to have such control means act in effect in an automatic manner. My invention in this regard is characterized by the conception of arranging the operative connection between the clutch pedal and the auxiliary brake mechanism to be responsive to the service or primary brake pedal whereby the clutch pedal will actuate the auxiliary brake mechanism only if the clutch pedal is depressed after the brake pedal. One significant aspect of this relationship is that normally the brake pedal is not touched when it is desired to depress the clutch pedal for shifting gears, therefor the auxiliary brake mechanism is not applied; but it is only necessary to depress the clutch pedal slightly ahead of the brake pedal to have both the clutch pedal and the brake pedal exert braking force.

A further object of my invention is to provide yielding means to urge the connection between the clutch pedal and the auxiliary brake mechanism into effective disposition and with respect to movement of the connection to effective disposition it is my object to provide fluid-pressure-responsive means in communication with the intake of the car engine under control of the brake pedal. An important purpose in mind here is to have the connection automatically take a disposition to operatively relate the clutch pedal with the auxiliary brake mechanism whenever the car engine is dead or whenever the brake pedal is not in its normal released position. I further contemplate having the connection between the clutch pedal and the auxiliary brake mechanism unresponsive to the brake pedal when the clutch pedal is holding the auxiliary brake mechanism in applied disposition.

By these relationships I achieve certain novel effects in the operation of a car. If the engine stalls on a hill, for example, the clutch pedal, regardless of the action of the brake pedal, will be effective to apply the auxiliary brake mechanism so that the right foot of the driver is free to start and accelerate the engine. It is to be noted further that if the clutch pedal is being used for brake action even when the engine is running, no movement of the brake pedal will affect that brake action.

A further object in mind is to provide a latch means for the auxiliary brake mechanism whereby brakes applied by the clutch pedal may be used for parking and whereby such brakes may be held applied at other times without the necessity of the driver continuously exerting force on the clutch pedal. In this connection I propose further to have such latch moved to its effective disposition by yielding means and moved to its ineffective disposition by fluid-pressure-actuated means connected to the engine intake. The following results flow from this particular arrangement: (1) So long as the car engine is running the latch will be ineffective and therefore the auxiliary brake mechanism will be released with release of the clutch pedal; (2) if the engine is dead forward movement of the clutch pedal will apply and latch the auxiliary brake mechanism for parking; and (3) the auxiliary brake mechanism so applied for parking will be automatically released by the fluid-pressure-actuated means as soon as the engine is again started up.

As further features I contemplate adding normally controlled means to cut off the last mentioned fluid-pressure-actuated means from the intake to permit the auxiliary brake mechanism to remain latched while the engine is running and also adding manually operable means to release the latch independently of the fluid-pressure-actuated means.

How all these objects and features are achieved will be understood by considering my detailed description of the accompanying drawing.

In the drawing,

Fig. 1 is a diagrammatic representation in perspective of the primary or service brake mechanism of a car, the usual brake pedal connected thereto and a valve in a vacuum line controlled by the brake pedal;

Fig. 2 shows in side elevation the clutch pedal and an associated member of my invention; and Fig. 3 shows diagrammatically the auxiliary brake mechanism and my arrangement for operation thereof including means associated with the brake pedal and means associated with the clutch pedal.

The arrangement shown in Figure 1 typifying any conventional primary or service brake mechanism of a car includes a brake pedal 10 connected through a rod 11 and rocker arm 12 with a rocker shaft 13; rocker members 14 at opposite ends of the shaft; a pair of brakes generally designated 15 connected respectively to the rocker members 14 by rods 16; and another pair of brakes, not shown, also connected respectively to the rocker members 14 by corresponding rods 17. The brake pedal is pivotally mounted at 18 and has a lower extension 19 that is suitably connected through a pin 20 and clevis 21 with the plunger 22 of a valve 23 in a vacuum line 24.

As best shown in Fig. 3 the body 25 of the valve 23 has a port 26 and the plunger 22 has a recess 27, these being so constructed and arranged that when the plunger is moved inward by brake-applying movement of the brake pedal, the recess 27 provides a passage from the atmosphere to the interior of the vacuum line 24 to destroy any vacuum condition therein.

The vacuum line 24 on one side of the valve 23 is connected to the intake manifold 30 of the automobile engine 31 and on the other side of the valve terminates in a fluid-pressure-actuated means generally designated 32.

The fluid-pressure-actuated means 32 includes a casing 33 the interior of which is divided by a diaphragm 34 into two compartments, a vacuum compartment 35 and a second compartment 36 that is in communication with the atmosphere through an aperture 37 in the casing. Vacuum line 24 communicates with the vacuum compartment 35 to engender a vacuum therein, whereby atmospheric pressure will flex the diaphragm inward with respect to compartment 35. A spring 38 acting between the wall of the casing and the diaphragm yields to such action but is strong enough to flex the diaphragm in the opposite direction when fluid pressure is equalized on the opposite sides of the diaphragm. The operating member of the fluid-pressure-actuating means 32 is a plunger 40 connected to the diaphragm 34 and extending outward through an aperture 41 in the casing 33. This operating member 40 controls the effectiveness of the means by which the clutch pedal of the car operates the auxiliary brake mechanism.

The particular auxiliary brake means shown herein comprises a brake band 44 cooperative with the transmission mechanism of the car in a well known manner but may comprise brakes associated with the same wheels as the previously mentioned brakes 15. The brake band 44 is tightened by rightward movement of a lever 45 having a cam portion 46 to draw the two ends of the brake band together against the opposition of the usual spring 47. The brake lever 45 is connected by a link 48 with a lever 49 mounted on a central pivot 50. The opposite end of the lever 49 is suitably connected with a slide member 53, for example the lever may extend into an aperture 54 in the slide with sufficient looseness to accommodate a range of angular variation in the position of the lever 49.

The slide member 53 is slidingly mounted in a pair of brackets 55 and 56 that extend from a plate 57, and the end of the slide is pivotally connected by a pin 58 with an arm 60. The arm 60 is supported by slide 53 to swing into and out of axial alignment therewith and is disposed alongside a finger 62 that extends downward from a clutch pedal 63. This pedal pivoted at 64 is the usual clutch pedal of the automobile, so that when the pedal is depressed to disengage the car clutch the finger 62 swings to the left. The arm 60 has a lateral projection or shoulder 65 which may be engaged by the finger 62 whereupon further depression of the clutch pedal will tighten the brake band 44 and incidentally shift the slide 53 to the left simultaneously.

Obviously, if the arm 60 is swung away from alignment with the slide 53 sufficiently to carry the projection 65 out of the path of finger 62, depression of the clutch pedal 63 will not apply the auxiliary brake 44. Mounted on the side of the arm 60 is a rail 67 the central portion of which is in spaced parallel relation to the arm. The previously mentioned plunger 40 has a suitable aperture 68 in its outer end that slidingly embraces the rail 67 with sufficient clearance to permit angular movement of the arm. It will be apparent that when the plunger 40 is retracted by virtue of vacuum condition in the compartment 35, the described means for operatively interconnecting the clutch pedal 63 and the auxiliary brake 44 will be in ineffective disposition, and that in the absence of such vacuum condition the plunger 40 urged to extended position by the spring 38 will hold the arm 60 against the finger 62, the interconnecting means then being in effective disposition for applying the auxiliary brake. To insure the movement to effective disposition of the interconnecting means I may add a second spring 70 interconnecting a fixed pin 71 and a pin 72 on the arm 60, but the combined strength of the two springs must not prevent action by the fluid-pressure-actuated means 32.

The slide member 53 has ratchet teeth 75 for cooperation with a pawl 76 that is pivotally mounted on a pin 77 extending outward from the plate 57. The pawl 76 has integral therewith an arm 78 that is operatively connected with a plunger 80 of a second fluid-pressure-actuated means generally designated 81.

This second fluid-pressure-actuated means like the first has a casing 82 divided by a diaphragm 83 into a vacuum compartment 84 and a second compartment 85, the latter being in communication with the atmosphere through a port 86. A spring 87 acting on the diaphragm tends to move rightward the diaphragm and plunger 80 connected to the diaphragm thereby swinging the pawl 76 into engagement with the teeth 75.

The vacuum compartment 84 in the casing is normally in communication with engine intake 30 through a vacuum line 90 which may branch from the vacuum line 24 as shown. Such communication may be cut off, however, at the will of the driver by pressing the button or head 91 of a plunger 92 on the dash 93 of the car, the plunger being operatively connected by suitable means with a plunger 94 of a valve generally designated 95. This valve is similar in construction to the previously described valve 23, and in like manner a recess 96 in the plunger 94 and a port 97 in the valve provide communication between the atmosphere and the interior of the line 90 when the button 91 is depressed.

Since it may be desirable to release the described latch in opposition to the spring in the absence of a vacuum in the line 90, I prefer to place a second button or knob 100 on the dash 93 and to connect this button by a rod or cable 101 with one arm of a lever 102. The lever 102 is pivotally mounted on a pin 103 in a bracket 104 and is adapted to swing against the plunger 80 and to shift the plunger sufficiently to release the pawl 76 from the teeth 75.

The operation of my invention will be clear from the foregoing disclosure. During ordinary driving the fluid-pressure means 32, being in communication with the engine intake manifold, will normally hold the arm 60 in the ineffective disposition shown in Fig. 3. Whenever the clutch pedal is depressed in advance of the brake pedal, or when, as during normal shifting of gears, the clutch pedal alone is depressed, the movement of the clutch pedal will have no effect on the auxiliary brake. If, however, the brake pedal is depressed in advance of clutch pedal, thereby operating the valve 23 to destroy any vacuum effect in the fluid-pressure means 32, the arm 60 will be moved by the springs 38 and 70 into effective disposition so that subsequent depression of the clutch pedal will apply the auxiliary brake.

Normally, as long as the engine is in operation, the latch will be held ineffective by the fluid-pressure means 81 so that the auxiliary brake mechanism will remain applied only while the clutch pedal is depressed. Should the driver desire to keep the auxiliary brake applied without the necessity of maintaining pressure on the clutch pedal, for example while holding the car temporarily motionless on a hill with the engine running, he need but press the button 91 on the dash to latch the auxiliary brake. The auxiliary brake will remain latched independently of the clutch pedal position until the button 91 is subsequently retracted.

If the engine stalls, the clutch will become effective automatically. Since the engine is usually not operating during parking, the latch enables me to employ the auxiliary brake for parking without the necessity of any unusual manipulation. If the engine is dead, a simple movement of the clutch pedal applies the brake. Usually the clutch pedal is depressed when a stop for parking is made and turning off the ignition while the clutch pedal is so depressed causes the auxiliary brake to be latched. Upon starting up the engine after a parking period the parking brake is automatically released. To release the brake without starting the engine, it is necessary merely to pull on the knob 100 to release the latch. For parking with the engine running the button 91 is manipulated.

The described braking system may be so constructed that whenever the engine is accelerated to an unusual extent, the resulting rise in pressure in the intake manifold will cause the pressure-responsive means 32 to release the arm 60 against the clutch pedal. In other words, instead of depressing the brake pedal in advance of the clutch pedal to bring the auxiliary brakes into action, I may simply accelerate the engine as the clutch pedal is moved forward. But if it is not desired that the acceleration of the engine have this effect, a vacuum booster may be added to the system in a manner known to the art.

It is highly desirable that the frictional contact between the clutch finger 62 and the shoulder 65 be adequate to resist any lateral force from the pressure-responsive means 32 while the auxiliary brake is being held applied. In other words, the operative connection between the clutch pedal and the auxiliary brake mechanism should be independent of the rest of the system whenever the clutch pedal is transmitting force to the auxiliary brake mechanism. The desired relationships are readily attained.

My invention, of course, may take other forms than the preferred arrangement herein chosen for illustration and is as broad as my claims.

Having described my invention, I claim:

1. In a vehicle having a primary braking mechanism, a brake-operating member controlling said mechanism, and a clutch-operating member, the combination therewith of: a second braking mechanism; and means responsive to said brake-operating member to operatively connect and disconnect said clutch-operating member with said second braking mechanism.

2. A combination as set forth in claim 1 in which said clutch-operating member is adapted to operate said second braking mechanism by its clutch-releasing movement and in which said means responsive to said brake-operating member is ineffective to operatively connect said clutch-operating member with said second braking mechanism if said clutch-releasing movement occurs before the brake-applying movement of said brake-operating member.

3. A combination as set forth in claim 1 in which means is provided to releasably hold said second braking mechanism in braking disposition.

4. In a vehicle having an engine, a braking mechanism, and a clutch-operating member, the combination therewith of: means to operatively connect said clutch-operating member with said braking mechanism whereby the clutch-releasing movement of the said member may apply said mechanism; and means to latch said mechanism in applied disposition, said latch means being releasable in response to starting of said engine.

5. In a vehicle having a primary braking mechanism, a brake-operating member controlling said mechanism, and a clutch-operating member, the combination therewith of: a second braking mechanism adapted to be applied by the clutch-releasing movement of said clutch-operating member; and means operated by the braking movement of said brake-operating member to permit actuation of said second braking mechanism by said clutch-operating member.

6. A combination as set forth in claim 4 in which means is provided to render said latch means unresponsive to the engine and in which manually operable means is provided to release the latch means.

7. In a vehicle having a primary braking mechanism, a brake-operating member controlling said mechanism, a clutch-operating member and an engine with an intake manifold, the combination therewith of: a second braking mechanism adapted to be applied by the clutch-releasing movement of said clutch-operating member; fluid-pressure-responsive means normally in communication with said intake manifold and adapted when actuated to prevent application of said second braking mechanism by said clutch-operating member and adapted to permit such application when not actuated; and means responsive to the brake-applying movement of said brake-operating member to cut off communication between said fluid-pressure-responsive means and said manifold thereby to permit application of said second braking mechanism by the clutch-operating member.

8. In a vehicle having a primary braking mechanism, a brake-operating member controlling said mechanism, a clutch-operating member and an engine with an intake manifold, the combination therewith of: a second braking mechanism; means movable between an ineffective disposition and an effective disposition at which effective disposition it operatively interconnects said clutch-operating member and said second brake mechanism to cause the clutch-releasing movement of said clutch-operating member to apply said second braking mechanism; means to urge said interconnecting means to its effective disposition; fluid-pressure-actuated means in communication with said manifold adapted to be actuated by the pressure differential between atmosphere and said manifold, said fluid-pressure-actuated means being adapted to move said interconnecting means to its ineffective disposition in opposition to said urging means; and means responsive to the brake-applying movement of said brake-operating member to cut off communication between said fluid-pressure-actuated means and said manifold.

9. In a vehicle having a primary braking mechanism, a brake-operating member controlling said mechanism, a clutch-operating member and an engine with an intake manifold, the combination therewith of: a second braking mechanism; means movable between an ineffective disposition and an effective disposition at which effective disposition it operatively interconnects said clutch-operating member and said second brake mechanism to cause the clutch-releasing movement of said clutch-operating member to apply said second braking mechanism; means to urge said interconnecting means to its effective disposition; fluid-pressure-actuated means in communication with said manifold adapted to be actuated by the pressure differential between atmosphere and said manifold, said fluid-pressure-actuated means being adapted to move said interconnecting means to its ineffective disposition in opposition to said urging means; means responsive to the brake-applying movement of said brake-operating member to cut off communication between said fluid-pressure-actuated means and said manifold; latch means to hold said second braking mechanism in applied disposition; means to urge said latch means into operative disposition; and a second fluid-pressure-actuated means in communication with said manifold adapted to be actuated by pressure differential between atmosphere and said manifold, said second fluid pressure means being adapted to move said latch means to inoperative disposition in opposition to said last-named urging means.

10. A combination as set forth in claim 9 that includes means to cut off communication between said second fluid-pressure-actuated means and said manifold.

11. A combination as set forth in claim 9 that includes means to cut off communication between said second fluid-pressure-actuated means and said manifold, and that also includes manually operable means to move said latch means to its inoperative disposition in opposition to said last-named urging means.

EVERETT C. MORPHET.